(12) United States Patent
Lee et al.

(10) Patent No.: US 9,357,383 B2
(45) Date of Patent: *May 31, 2016

(54) HASH KEY GENERATION APPARATUS AND METHOD FOR MULTIPLE CARDS COMMUNICATION SYSTEM

(71) Applicant: INTEL CORPORATION, Santa Clara, CA (US)

(72) Inventors: Anthony S. Lee, San Diego, CA (US); Shu Wang, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 2 days.

This patent is subject to a terminal disclaimer.

(21) Appl. No.: 14/588,673

(22) Filed: Jan. 2, 2015

(65) Prior Publication Data

US 2015/0126157 A1 May 7, 2015

Related U.S. Application Data

(63) Continuation of application No. 12/686,172, filed on Jan. 12, 2010, now Pat. No. 8,954,034.

(60) Provisional application No. 61/144,388, filed on Jan. 13, 2009, provisional application No. 61/160,672, filed on Mar. 16, 2009.

(51) Int. Cl.
*H04M 1/66* (2006.01)
*H04W 12/04* (2009.01)
*H04W 60/00* (2009.01)
*H04W 12/10* (2009.01)

(52) U.S. Cl.
CPC ............... *H04W 12/04* (2013.01); *H04M 1/66* (2013.01); *H04W 60/005* (2013.01); *H04W 12/10* (2013.01)

(58) Field of Classification Search
CPC ..................................... H04W 12/04
See application file for complete search history.

(56) References Cited

U.S. PATENT DOCUMENTS

| 5,749,282 | A | 5/1998 | Brow et al. | |
|---|---|---|---|---|
| 2006/0095600 | A1 | 5/2006 | Lee et al. | |
| 2008/0226073 | A1 | 9/2008 | Hawkes et al. | |
| 2009/0061934 | A1* | 3/2009 | Hauck et al. | 455/558 |
| 2012/0020325 | A1* | 1/2012 | Swamy et al. | 370/331 |

* cited by examiner

*Primary Examiner* — Justin Lee
(74) *Attorney, Agent, or Firm* — Blakely, Sokoloff, Taylor & Zafman LLP (57) ABSTRACT

A mobile station having a plurality of removable user identification modules, each configured to store a corresponding information associated with a corresponding plurality of user identifications; and key generation logic, configured generate a hash key based on the corresponding information according to the plurality of removable user identification modules; and hash logic, configured to employ the single hash key to determine a plurality of parameters, where each of the parameters comprises a single control channel that is common for all of the corresponding plurality of cellular subscriptions, and where the single control channel is employed for concurrent communications with a base station for the all of the corresponding plurality of cellular subscriptions.

14 Claims, 5 Drawing Sheets

ESN-BASED HASH APPARATUS

FIG. 1

SINGLE R-UIM REGISTRATION ATTRIBUTES

FIG. 2
DUAL R-UIM REGISTRATION EXAMPLE

FIG. 3

IMSI-INDEPENDENT HASH APPARATUS

FIG. 4

ESN-BASED HASH APPARATUS

FIG. 5
RANDOM NUMBER HASH APPARATUS

HASH KEY GENERATION APPARATUS AND METHOD FOR MULTIPLE CARDS COMMUNICATION SYSTEM

CROSS-REFERENCE TO RELATED APPLICATIONS

This application is a continuation of the following U.S. patent application, which is herein incorporated by reference for all intents and purposes.

| SERIAL NUMBER | FILING DATE | TITLE |
| --- | --- | --- |
| 12/686,172 (VTU.09-0026-US) | Jan. 2, 2010 | HASH KEY GENERATION APPARATUS AND METHOD FOR MULTIPLE CARDS COMMUNICATION SYSTEM |

The above noted application claims the benefit of the following U.S. Provisional applications, each of which is herein incorporated by reference for all intents and purposes.

| SERIAL NUMBER | FILING DATE | TITLE |
| --- | --- | --- |
| 61/144,388 (VTU.09-0015-US) | Jan. 13, 2009 | ESN BASED HASH KEY |
| 61/160,672 (VTU.09-0026-US) | Mar. 16, 2009 | IMSI INDEPENDENT HASH KEY |

BACKGROUND OF THE INVENTION

1. Field of the Invention

This invention relates in general to the field of cellular communications, and more particularly to a method and apparatus for improving communications over cellular networks by maximizing the use of common hardware and software in a mobile station that provides for multiple cellular subscriptions.

2. Description of the Related Art

The cell phone industry is undergoing exponential growth, not only in this country, but all over the world. In fact, it is well known that the over twenty percent of the adult population in the United States do not even have a traditional landline telephone. In addition to those who do not own a conventional telephone, nearly ninety percent of the adult population owns a wireless phone.

Meanwhile the usage of cell phones is increasing as well over the use of traditional landline telephone coverage. In fact, one in seven adults now uses only cell phones. Whereas in the past cell phones were used when a landline was not available or under emergency conditions, lower carrier rates, affordability of family packages, and free mobile-to-mobile or friend-to-friend promotions have fostered in significant increases in usage. It is not uncommon today to walk into any public forum or facility and notice a majority of the people there talking on their cell phones.

Beyond our borders, cell phone use is often times more prevalent than it is in this country due to the fact that wireless infrastructures are more easily deployed that traditional landline infrastructure. As one skilled in the art will appreciate, it is not uncommon in many parts of the world, and more rural areas of the United States, to note exclusive use of cell phones.

Many cellular providers offer subscriptions that include roaming for a fixed additional monthly fee. That is, when calls are placed or received in a region that is covered by a different cellular service provider, the per-minute roaming costs associated with the call are not passed on to the user. These plans that preclude per-minute roaming charges are often referred to as "national" or "nationwide" plans.

However, in many parts of this country, as in other parts or the world, per-minute roaming charges are passed on to the user. And under many imaginable practical scenarios where cell phone service may be the only option, a user may have to subscribe to more than one cellular service just to keep the costs down. Consider a commuter who lives in one city served by one cellular company and who commutes to work in another city that is served by another cellular company. In the absence of a non-roaming plan, the user is forced to carry two cell phones, or at best to swap out user modules in a single cell phone that is compatible with both cellular networks. This is undesirable. It is rather desirable to carry one phone that is capable of concurrently monitoring for and placing calls associated with, say, both of his/her subscriptions, and a particular subscription is employed to make calls depending upon the user's location.

But to accommodate more than one subscription, in addition to providing for storage of user identification information unique to each subscription service, the mobile station itself must be able to monitor control channels, paging channels, and assigned frequencies, among other functions, for both, or more than two subscription services. Yet, as one skilled in the art will appreciate, to perform two tasks at the same time may require duplicate hardware or software resources within the phone. And this is undesirable.

Therefore, what is needed is an apparatus and method where a single mobile phone can monitor and place calls associated with more than one cellular subscription service that maximized the use of common hardware and software within the mobile phone.

In addition, what is needed is a technique for mapping control channels, paging channels, and other parameters needed for a cell phone to communicate over a cellular network, where the mapping is performed in a manner that minimizes the use of separate resources within a cell phone while still maintaining acceptable quality of service.

SUMMARY OF THE INVENTION

The present invention, among other applications, is directed to solving the above-noted problems and addresses other problems, disadvantages, and limitations of the prior art.

The present invention provides a superior technique for maximizing the use of common hardware and software in a mobile station that provides for more than one cellular subscription. In one embodiment, a mobile station is provided. The mobile station has a plurality of removable user identification modules, each configured to store a corresponding information associated with a corresponding plurality of user identifications; and key generation logic, configured generate a hash key based on the corresponding information according to the plurality of removable user identification modules; and hash logic, configured to employ the single hash key to determine a plurality of parameters, where each of the parameters comprises a single control channel that is common for all of the corresponding plurality of cellular subscriptions, and where the single control channel is employed for concurrent communications with a base station for the all of the corresponding plurality of cellular subscriptions.

One aspect of the present invention contemplates a base station that includes a mobile station register and hash logic. The mobile station register is configured to extract a single hash key common to a plurality of user identifications for a corresponding plurality of cellular subscriptions from a registration message associated with a mobile station, and to send a registration acknowledgement message to the mobile station indicating hash key adoption status by the base station; and hash logic, coupled to the mobile station register, configured to employ the hash key to determine a plurality of parameters, where each of the plurality of parameters comprises a single control channel that is common for all of the corresponding plurality of cellular subscriptions, and where the single control channel is employed for concurrent communications with the base station for the all of the corresponding plurality of cellular subscriptions.

Another aspect of the present invention contemplates a method for a mobile station which is wirelessly coupled to a cellular network. The method includes: employing a plurality of removable user identification modules within the mobile station to store information associated with a corresponding plurality of user identifications for a corresponding plurality of cellular subscriptions; generating a single hash key common to the corresponding plurality of cellular subscriptions based on the information stored in the plurality of removable user identification modules; and using the hash key to determine a plurality of parameters, where each of the plurality of parameters comprises a single control channel that is common for all of the corresponding plurality of cellular subscriptions, and where the single control channel is employed for concurrent communications with a base station for the all of the corresponding plurality of cellular subscriptions.

One aspect of the present invention contemplates a method for a base station which is wirelessly coupled to a mobile station. The method includes: extracting a single hash key from a registration message, where the single hash key is common to a plurality of user identifications for a corresponding plurality of cellular subscriptions associated with the mobile station; sending a registration acknowledgement message to the mobile station, where the registration acknowledgement message indicates hash key adoption status by the base station; and employing the hash key to determine a plurality of parameters, where each of the parameters comprises a single control channel that is common for all of the corresponding plurality of cellular subscriptions, and where the single control channel is employed for concurrent communications with the mobile station for the all of the corresponding plurality of cellular subscriptions.

Another aspect of the present invention comprehends a wireless system comprising: a mobile station and a base station, the mobile station further comprising: a plurality of removable user identification modules, each configured to store a corresponding information associated with a corresponding plurality of user identifications; key generation logic, configured generate a hash key based on the corresponding information according to the plurality of removable user identification modules; and first hash logic, coupled to the key generation logic, configured to employ the hash key to determine a plurality of parameters; the base station further comprising: an mobile station register, configured to extract the hash key from a registration message and send a registration acknowledgement message corresponding to the mobile station, the registration acknowledgement message indicates the hash key adoption status by the base station; and second hash logic, coupled to the mobile station register, configured to employ the hash key to determine a plurality of parameters, where each of the parameters are determined to arrange the hardware and software within the mobile station to concurrently provide for communications with the base station in support of the plurality of user identifications.

BRIEF DESCRIPTION OF THE DRAWINGS

These and other objects, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
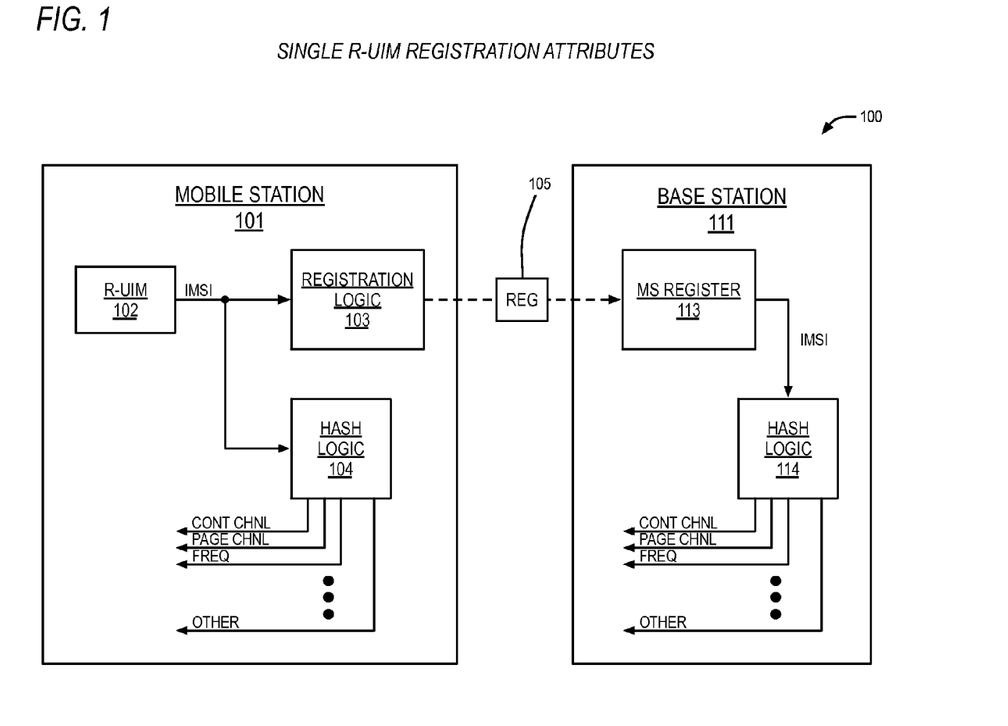
FIG. 1 is a block diagram illustrating how attributes and parameters that dictate how a particular mobile station will communicate with a particular base station within a cellular region are determined.
Figure 2:
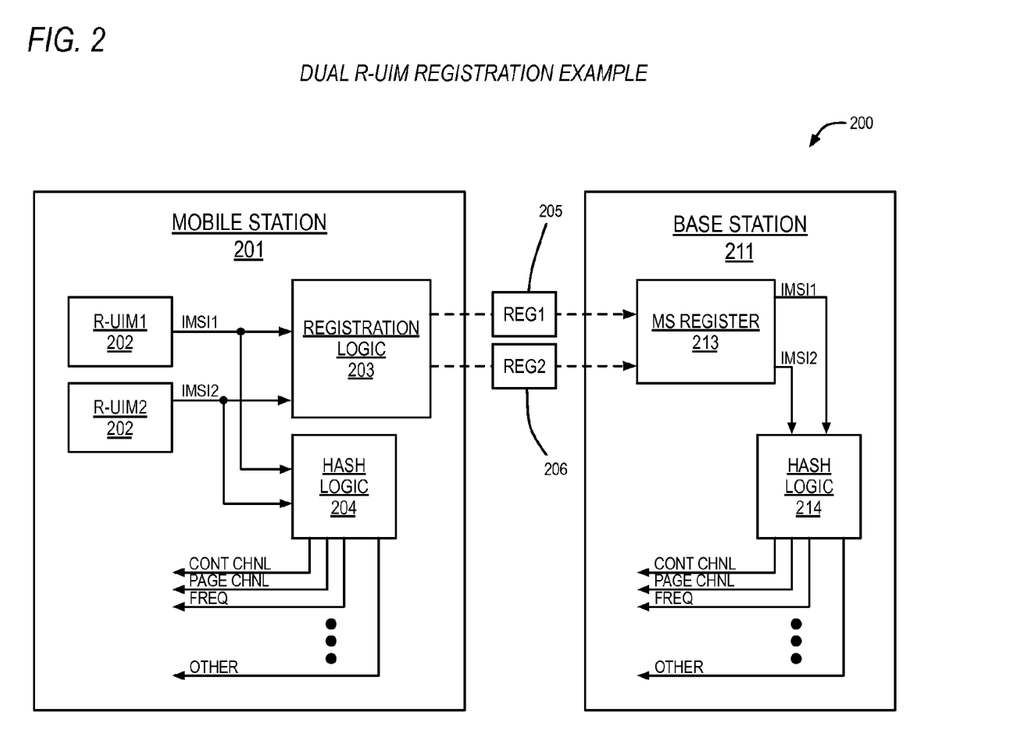
FIG. 2 is a diagram depicting how the determinations made in the example of FIG. 1 are limiting when a mobile station that is capable of supporting more than one R-UIM attempts to register with a particular base station.

In view of the above background on wireless networks and associated techniques employed within present day cellular communication systems for determining attributes and parameters for communication between a mobile station and a base station within a given cellular region, a discussion of the disadvantages and limitations associated with these techniques will now be presented with reference to FIGS. 1-2. Following this, a discussion of the present invention will be provided with reference to FIGS. 3-5. The present invention overcomes these disadvantages and limitations by providing apparatus and methods whereby a mobile station capable of supporting multiple R-UIMs can optimize the use of common internal hardware and software resources while still retaining the capability maintain concurrent communications with the base station for each of the cellular numbers that correspond to each of the multiple R-UIMs installed.

Now referring to FIG. 1, a block diagram 100 is presented illustrating how attributes and parameters are determined that dictate how a particular mobile station 101 will communicate with a particular base station 111 within a cellular region. The mobile station 101 has a removable user identity module (R-UIM) 102, which is also referred to as a removable user identification module 102. The R-UIM 102 is a small removable device that is employed by mobile stations (i.e., cell phones) 101 to store identification information associated with a particular user's subscription to a cellular service which includes, but it is not limited to the identity of the home network (e.g., China Telecom, Verizon, AT&T, etc.) and international mobile subscriber identity (IMSI). The IMSI is a unique number that is assigned exclusively to a single subscriber by the cellular subscription provider and includes the mobile station identification, that is, the phone number assigned to the user by the provider, along with other bits of information that indicate the country in which the subscription is issued and the particular cellular network. Accordingly, the IMSI which is stored in a user's R-UIM 102 is unique.

In another embodiment, the IMSI is replaced by other identification information to recognize the different mobile subscriber. The identification information may be stored in the mobile device or in a separate device which could be installed in the mobile device. In the following description, the IMSI is introduced as a example to illustrate the present invention.

By having a removable device 102 which stores the user's identification information, a user is thus allowed to change mobile stations 101 by simply swapping the R-UIM 102 from one mobile station to the next. Such a capability simplifies the processes of phone repairs, upgrades, loans, and the like, while also allowing for the given mobile station 101 to be used on a different wireless network other than the home network.

In the United States, most of the cellular subscription providers allow for interoperation with mobile stations 101 that subscribe to different cellular services and provide users with the option to purchase "national" plans that enable a user to place calls transparently over any one of these networks for a fixed monthly fee. Other plans, however, charge users a per-minute roaming fee when the particular mobile station 101 places or receives a call that is outside of its home network service area.

The diagram 100 shows that the R-UIM 102 provides the IMSI stored therein to registration logic 103 and hash logic 104, both disposed within the mobile station 101. In operation, the registration logic 103 is configured to generate parameters associated with a registration message, REG 105, which is transmitted by the mobile station 101 to a base station 111 when the mobile station powers up within a given cellular region. Part of the registration process includes the transmission of information contained within the IMSI so that the base station 111 will know whether the mobile station 101 is a home network device or whether it is roaming.

Registration with the base station 111 is a process that is well defined for virtually all present day cellular networks, however, once the base station 111 is cognizant of the mobile station's presence within the network, several other attributes and parameters must be determined and initialized, both within the mobile station 101 and within the base station 111, in order to allow for the placement and routing of calls and data to and from the mobile station 101. These parameters include the determination and assignment of a control channel and paging channel within the cellular region that the mobile station 101 will monitor to be notified of pending calls. That is, to notify the mobile station 101 that a call is pending, the base station 111 will send a message to the mobile station over these channels. Thus, even when the mobile station 101 is idle, it is constantly monitoring activity on these channels.

Registration also determines which frequency channel and other related resources that the mobile station 101 will employ to communicate with the base station 111. Accordingly, present day standards dictate that the IMSI is employed as an input to the circuits and algorithms that determine the aforementioned channels and resources. For clarity of presentation, these circuits and algorithms are summarized according to the present application as hash logic 104 within the mobile station 101 and as hash logic 114 within the base station 111. Although the two hash logics 104, 114 are not equivalent devices, for purposes of the present application they perform substantially the same common functions from the standpoint of determining control channels, paging channels, frequency channels, and other resources that are required to perfect interoperation between the mobile station 101 and the base station 111.

And, as noted above, the IMSI is presently employed as an input to the hash logic 104 within the mobile station 101 to determine the noted attributes and parameters. Via various hashing algorithms performed by the hash logic 104, the IMSI is employed as an input to allow for multiple users to be optimally distributed among the available channels, frequencies, and other resources of the cellular service area. These hashing algorithms thus preclude overuse of, say, one control channel while the remaining control channels go unused. The hash logics 104, 114, thus perform a mapping function from the IMSI to a subset of limited resources within the network which must be employed to communicate.

When the mobile station 101 transmits the registration message 105 to the base station 111, the IMSI is implicitly transmitted. Accordingly, the base station 111 includes a mobile station (MS) register 113, which extracts or infers the unique IMSI from the registration message 105 and which passes the IMSI to the hash logic 114. Thus, the hash logic 114 employs the IMSI provided by the mobile station 101 to determine the same parameters and attributes which are determined by the hash logic 104 within the mobile station 101. Consequently, through passing of the IMSI during registration, all of the information necessary for the assignment of parameters and attributes associated with communications going forward between the mobile station 101 and the base station 111 are provided.

Notwithstanding the advantages of the above standard registration technique, the present inventors have noted several limitations as well, particularly under conditions where more than a single R-UIM 102 are utilized within a given mobile station 101. For example, because the R-UIM is removable, the user's identification information is thus capable of being moved from one mobile station to the next. In addition, more than a single R-UIM 102 may be used within a given mobile station 101 to preclude, say, roaming charges that would otherwise be incurred. Consider a scenario where a commuter lives within City A and works within City B. If Cellular Provider A provides for wireless communications within City A, but not within City B, then roaming charges would be incurred by the commuter when he/she is at work.

And the present inventors have noted that it is not uncommon to find that users subscribe to more than one cellular subscription service to preclude roaming charges under scenarios similar to that described above. Consider, then, that the commuter above also subscribes to a service by Cellular Provider B, which provides for wireless communications within City B. Consequently, the commuter precludes roaming charges by having two different IMSIs, and heretofore by having two different mobile stations, one for use in City A and the other for use in City B. And if a single mobile station 101 is capable of operating over both cellular networks, then the user may opt to employ an R-UIM 102 for Cellular Provider A when he/she is in City A and swap to an R-UIM 102 for Cellular Provider B when he/she is in City B.

While the above dual-phone application is desirable from the standpoint of precluding roaming charges, it is undesirable from the point of view of the commuter who must now carry two mobile stations on his/her person, or who must swap out R-UIMs when moving from city to city. Accordingly, those in the industry have noted this limitation and have proposed mobile stations that are capable of utilizing more than a single R-UIM 102. A discussion of a dual R-UIM technique will now be discussed with reference to FIG. 2.

Turning to FIG. 2, a diagram 200 is presented depicting how the determinations made in the example of FIG. 1 are limiting when a mobile station 201 that is capable of supporting more than one R-UIM 202 attempts to register with a particular base station 211. Like the mobile station 101 of FIG. 1, the mobile station 201 of FIG. 2 includes registration logic 203, and hash logic 204. But unlike the mobile station 101 of FIG. 1, the mobile station 201 of FIG. 2 has two R-UIMs 202, R-UIM1 and R-UIM2, which are coupled to provide IMSI1 and IMSI2 to both the registration logic 203 and the hash logic 204.

In operation, the registration logic 203 and the hash logic 204 perform substantially the same functions as like-numbered elements of FIG. 1, where the hundreds digit is replaced with a "2," however, both the registration logic 203 and hash logic 204 are capable of performing those functions for more than a single R-UIM 202. Hence, when the mobile station is powered up, both subscriptions must be registered with the base station 211. Accordingly, one or more registration messages 205, 206 are transmitted to the base station 211 in order to indicate the presence of both user subscriptions, that is, one according to IMSI1, which is stored in R-UIM1 202, and the other according to IMSI2, which is stored in R-UIM2 202.

Likewise, an MS register 213 and hash logic 214 within the base station 211 perform substantially the same functions as like-numbered elements of FIG. 1, where the hundreds digit is replaced with a "2," however, both the MS register 213 and hash logic 214 are capable of performing those stated functions for more than a single IMSI.

In order to effectively field a dual R-UIM mobile station 201, hardware, software, and resources must be provided therein to support concurrent monitoring two control channels, two paging channels, two frequency channels, and two instantiations of all other resources that are required to communicate with the base station 211 to provide for the two user subscriptions concurrently. Stated differently, to monitor for calls and data concurrently for the user identities stored in each of the R-UIMs 202, it is highly probably that the hash logics 204, 214 would map IMSI1 and IMSI2 according to the standard techniques to two distinct control channels, two distinct paging channels, two separate frequency channels, and two distinct assignments to any other necessary resources. And, as one skilled in the art will appreciate, to concurrently perform the aforementioned tasks would require duplicate hardware, software, and resources within the mobile station 201, or would necessitate degraded performance as a result of having to multiplex hardware, software, and other resources to accommodate use of the two different subscriptions.

Consequently, the present inventors have noted the desirability within the field of a mobile station 201 capable of supporting more than one R-UIM 202, however, they have also noted the disadvantages and limitations of such a mobile station 201 because of a requirement to support monitoring of more than one control channel, paging channel, frequency channel, and other resources. To provide for dual monitoring in the way described above is wasteful of power, it reduces battery life, and also results in heavier, more bulky mobile stations 201 that are less reliable than have heretofore been provided.

In addition, the present inventors have observed that these disadvantages and limitations noted above are entirely a result of current standards that employ the IMSI to hash to a subset of the channel and other resources provided over the network. Consequently, the present inventors propose techniques whereby the utilization of common hardware, software, and other resources within a mobile station can be optimized for use in a dual R-UIM environment. These techniques will now be described with reference to FIGS. 3-5.

Figure 3:
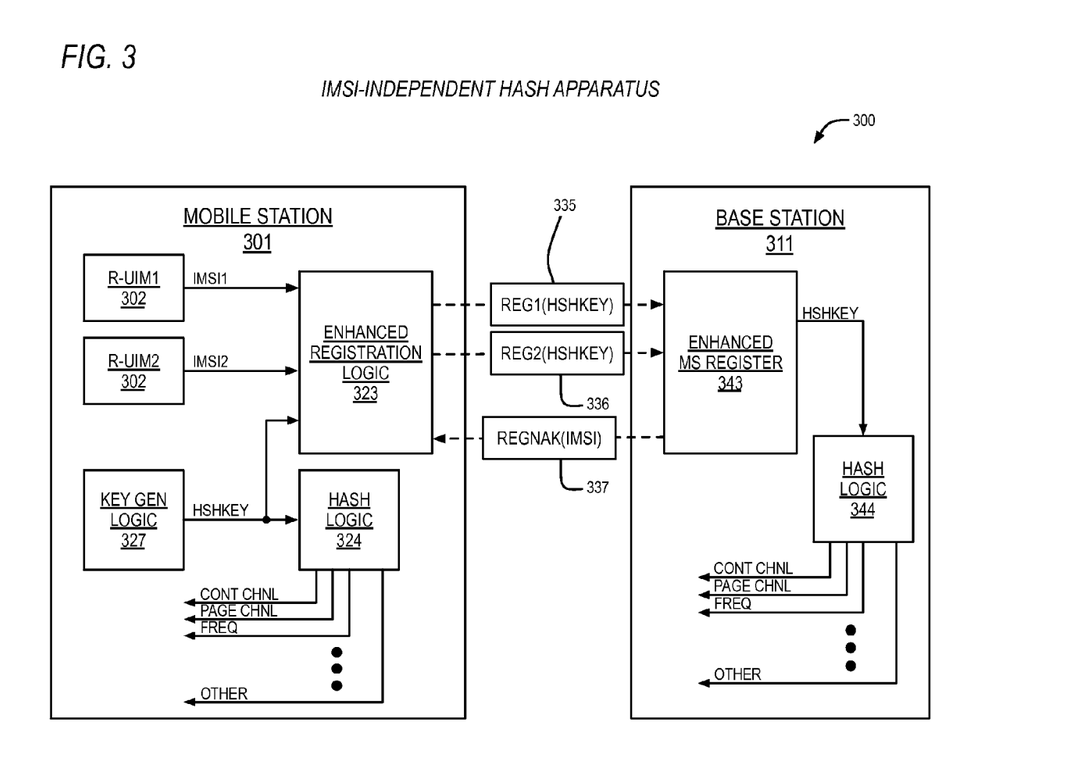
FIG. 3 is a block diagram featuring an IMSI-independent hash apparatus according to the present invention.

FIG. 3 is a block diagram 300 featuring an IMSI-independent hash apparatus according to the present invention. The apparatus includes a dual R-UIM mobile station 301 and a base station 311 capable of supporting the dual R-UIM mobile station 301. The mobile station 301 has two R-UIMs 302: R-UIM1 302, which stores and provides a first IMSI, IMSI1, and R-UIM2 302, which stores and provides a second IMSI, IMSI2. The IMSIs are provided to enhanced registration logic 323. The mobile station 301 also includes improved hash logic 324. In contrast to the mobile stations 101, 102 of FIGS. 1 and 2, the mobile station 301 according to the present invention also has key generation logic 327, or a key generation circuit 327, that is coupled to both the enhanced registration logic 323 and the hash logic 324 by providing a hash key HSHKEY as an output.

The hash key generation, in one embodiment, is a contractive mapping from the input data with different length to the output with a shorter fixed length. Hash functions are mostly used to speed up table lookup and data comparison tasks. In one cellular system, the hash function and algorithm is predetermined by both of the service providers and the equipment providers.

In operation, the key generation logic 327 generates a hash key HSHKEY for use by the hash logic 324 that is common to both of the subscriptions whose information is stored in the two R-UIMs 302. Thus, in one embodiment, the hash logic 324 employs HSHKEY to hash to a single control channel, a single paging channel, a single frequency channel, and a single copy of any other required attribute or parameter that is required to perfect communications with the base station 311 for both of the cellular subscriptions. In an embodiment where it is necessary to maintain a separate attribute or parameter for each of the cellular subscriptions, then the hash logic 324 employs HSHKEY to optimize resources within the mobile station 301 by maximizing common resources while performing those unique dual parameter assignments.

When the mobile station 301 powers up, one or more registration messages 335, 336 are transmitted to the base station 311 that contain or implicitly reference the two separate sets of user identification information. But in addition, the one or more registration messages 335, 336 include the hash key HSHKEY that is generated by the key generator 327.

An enhanced mobile station register 343 within the base station 311 is employed to extract HSHKEY from the one or more registration messages 335, 336, and HSHKEY is passed to improved hash logic 344 within the base station 311. In one embodiment, the hash logic 344 employs HSHKEY to hash to a single control channel, a single paging channel, a single frequency channel, and a single copy of any other required attribute or parameter that is required to perfect communications between the base station 311 and the mobile station 301 for both of the cellular subscriptions. In an embodiment where it is necessary to maintain a separate attribute or parameter for each of the cellular subscriptions, then the hash logic 344 employs HSHKEY to optimize resources within the mobile station 301 by maximizing common resources therein while performing those unique dual parameter assignments.

Under circumstances where it is necessary for the base station 311 to comport with legacy protocols, or for other various reasons, provision is made according to the present invention for a registration acknowledgement message 337 that rejects use of the generated hash key HSHKEY and forces use of IMSI-based resource assignments. The message 337 is thus sent to the mobile station 301 under these conditions and the mobile station 301 in turn utilizes one or more of the IMSI's stored within the R-UIMs 302 to hash to control channels and etc. under degraded operating conditions.

Advantageously, the mobile station according to the present invention contemplates monitoring of single control and paging channels, use of a single frequency band, and communization of other communication associated resources for a dual R-UIM application. Accordingly, a user may employ a single mobile station 301 to enjoy calls and data corresponding to two cellular subscriptions, while maintaining approximately the same power consumption, battery life, size, reliability, and as a result, the same cost as that which has heretofore only been provided in support of a single subscription.

Figure 4:
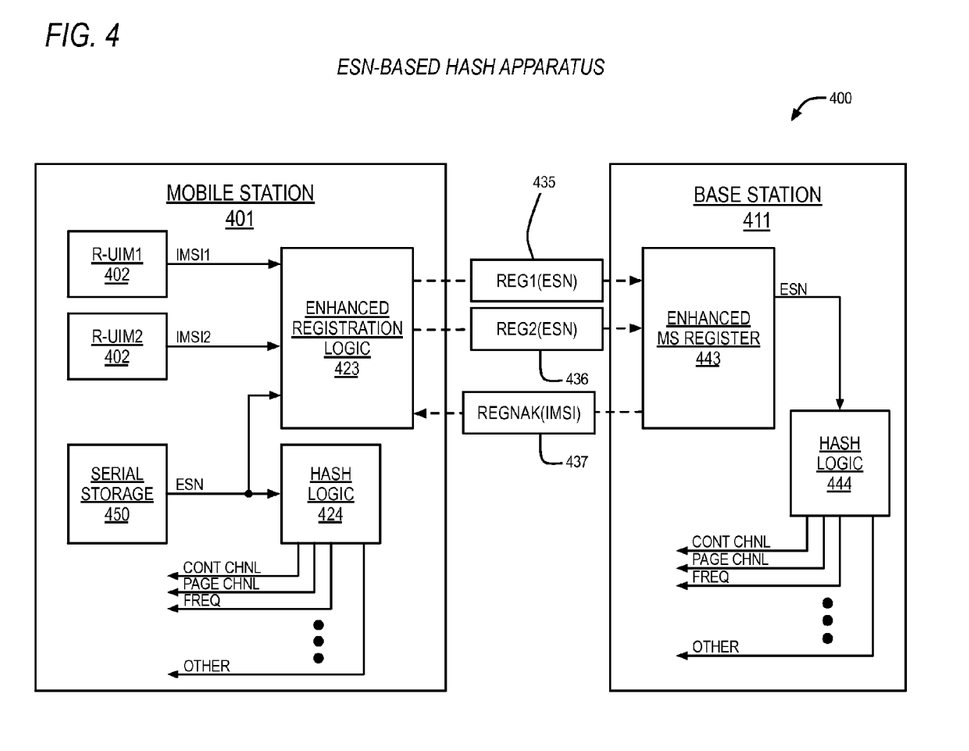
FIG. 4 is a block diagram showing an ESN-based hash apparatus according to one embodiment of the present invention.

Now referring to FIG. 4, a block diagram 400 is presented showing an ESN-based hash apparatus according to one embodiment of the present invention. Like the hash apparatus of FIG. 3, the ESN-based hash apparatus includes a dual R-UIM mobile station 401 and a base station 411 capable of supporting the dual R-UIM mobile station 401. The mobile station 401 has two R-UIMs 402: R-UIM1, which stores and provides a first IMSI, IMSI1, and R-UIM2 402, which stores and provides a second IMSI, IMSI2. The IMSIs are provided to enhanced registration logic 423. The mobile station 401 also includes improved hash logic 424. The mobile station 401 also has serial storage 450 that is coupled to both the enhanced registration logic 423 and the hash logic 424. The serial storage 450 stores an electronic serial number ESN that is unique to the mobile station 401 and which is extracted for use by and provided to both the registration logic 423 and the hash logic 424. In another embodiment, a mobile equipment identifier (MEID) is extracted for use by and provided to both the registration logic 423 and the hash logic 424.

In operation, the ESN provided by the serial storage 450 is used by the hash logic 424 in a manner substantially similar to use of the hash key HSHKEY in the embodiment of FIG. 3 to maximize assignment of common parameters and attributes for both of the subscriptions whose information is stored in the two R-UIMs 402. Thus, in one embodiment, the hash logic 424 employs ESN to hash to a single control channel, a single paging channel, a single frequency channel, and a single copy of any other required attribute or parameter that is required to perfect communications with the base station 411 for both of the cellular subscriptions. In an embodiment where it is necessary to maintain a separate attribute or parameter for each of the cellular subscriptions, then the hash logic 424 employs ESN to optimize resources within the mobile station 401 by maximizing common resources while performing those unique dual parameter assignments required.

When the mobile station 401 powers up, one or more registration messages 435, 436 are transmitted to the base station 411 that contain or implicitly reference the two separate sets of user identification information. But in addition, the one or more registration messages 435, 436 include the ESN that is produced by the serial storage 450.

An enhanced mobile station register 443 within the base station 411 is employed to extract ESN from the one or more registration messages 435, 436, and ESN is passed to improved hash logic 444 within the base station 411. In one embodiment, the hash logic 444 employs ESN to hash to a single control channel, a single paging channel, a single frequency channel, and a single copy of any other required attribute or parameter that is required to perfect communications between the base station 411 and the mobile station 401 for both of the cellular subscriptions. In an embodiment where it is necessary to maintain a separate attribute or parameter for each of the cellular subscriptions, then the hash logic 444 employs ESN to optimize resources within the mobile station 401 by maximizing common resources therein while performing those unique dual parameter assignments required.

Under circumstances where it is necessary for the base station 411 to comport with legacy protocols, or for other various reasons, provision is made according to the present invention for a registration acknowledgement message 437 that rejects use of the ESN and forces use of IMSI-based resource assignments. The message 437 is thus sent to the mobile station 401 under these conditions and the mobile station 401 in turn utilizes one or more of the IMSI's stored within the R-UIMs 402 to hash to control channels and etc. under degraded operating conditions.

Figure 5:
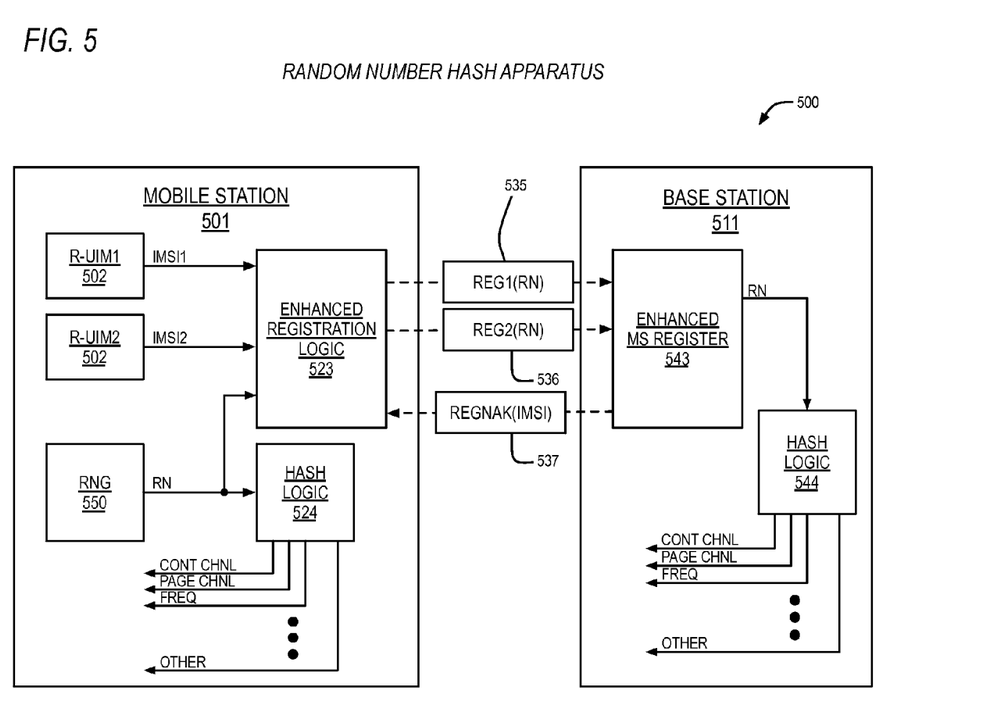
FIG. 5 is a block diagram illustrating a random number hash apparatus according to another embodiment of the present invention.

Now turning to FIG. 5, a block diagram 500 is presented showing a random number based hash apparatus according to another embodiment of the present invention. Like the hash apparatus of FIGS. 3 and 4, the random number based hash apparatus includes a dual R-UIM mobile station 501 and a base station 511 capable of supporting the dual R-UIM mobile station 501. The mobile station 501 has two R-UIMs 502: R-UIM1, which stores and provides a first IMSI, IMSI1, and R-UIM2 502, which stores and provides a second IMSI, IMSI2. The IMSIs are provided to enhanced registration logic 523. The mobile station 501 also includes improved hash logic 524. The mobile station 501 also has a random number generator (RNG) 550 that is coupled to both the enhanced registration logic 523 and the hash logic 524. The RNG 550 generates a random number RN which is provided to both the registration logic 523 and the hash logic 524.

In operation, the RN provided by the RNG 550 is used by the hash logic 524 in a manner substantially similar to use of the hash key HSHKEY in the embodiment of FIG. 3 and the ESN in the embodiment of FIG. 4 to maximize assignment of common parameters and attributes for both of the subscriptions whose information is stored in the two R-UIMs 502. Thus, in one embodiment, the hash logic 524 employs RN to hash to a single control channel, a single paging channel, a single frequency channel, and a single copy of any other required attribute or parameter that is required to perfect communications with the base station 511 for both of the cellular subscriptions. In an embodiment where it is necessary to maintain a separate attribute or parameter for each of the cellular subscriptions, then the hash logic 524 employs RN to optimize resources within the mobile station 501 by maximizing common resources while performing those unique dual parameter assignments required.

When the mobile station 501 powers up, one or more registration messages 535, 536 are transmitted to the base station 511 that contain or implicitly reference the two separate sets of user identification information. But in addition, the one or more registration messages 535, 536 include the RN that is produced by the RNG 550.

An enhanced mobile station register 543 within the base station 511 is employed to extract RN from the one or more registration messages 535, 536, and RN is passed to improved hash logic 544 within the base station 511. In one embodiment, the hash logic 544 employs RN to hash to a single control channel, a single paging channel, a single frequency channel, and a single copy of any other required attribute or parameter that is required to perfect communications between the base station 511 and the mobile station 501 for both of the cellular subscriptions. In an embodiment where it is necessary to maintain a separate attribute or parameter for each of the cellular subscriptions, then the hash logic 544 employs RN to optimize resources within the mobile station 501 by maximizing common resources therein while performing those unique dual parameter assignments required.

Under circumstances where it is necessary for the base station 511 to comport with legacy protocols, or for other various reasons, provision is made according to the present invention for a registration acknowledgement message 537 that rejects use of the RN and forces use of IMSI-based resource assignments. The message 537 is thus sent to the mobile station 401 under these conditions and the mobile station 401 in turn utilizes one or more of the IMSI's stored within the R-UIMs 502 to hash to control channels and etc. under degraded operating conditions.

Those skilled in the art should appreciate that they can readily use the disclosed conception and specific embodiments as a basis for designing or modifying other structures for carrying out the same purposes of the present invention, and that various changes, substitutions and alterations can be made herein without departing from the scope of the invention as defined by the appended claims.

What is claimed is:

1. A mobile station comprising:
   a plurality of removable user identification modules, each configured to store information associated with a corresponding plurality of user identifications for a corresponding plurality of cellular subscriptions;
   key generation logic, configured to generate a single hash key common to said corresponding plurality of user identifications based on said information stored in said plurality of removable user identification modules; and
   hash logic, coupled to said key generation logic, configured to employ said single hash key to determine a plurality of parameters, wherein each of said parameters comprises a single control channel that is common for all of said corresponding plurality of cellular subscriptions, and wherein said single control channel is employed for concurrent communications with a base station for said all of said corresponding plurality of cellular subscriptions.

2. The mobile station as recited in claim 1, wherein said single hash key comprises an electronic serial number.

3. The mobile station as recited in claim 1, wherein said single hash key is transmitted to a cellular network by a registration message of the mobile station over the cellular network, and wherein when the mobile station receives a registration acknowledgement message that indicates said single hash key is rejected by the cellular network, then said mobile station uses said corresponding user identifications to determine resource assignments that are based on each of said corresponding user identifications.

4. A base station comprising:
   a mobile station register, configured to extract a single hash key common to a plurality of user identifications for a corresponding plurality of cellular subscriptions from a registration message associated with a mobile station, and to send a registration acknowledgement message to the mobile station indicating hash key adoption status by the base station; and
   hash logic, coupled to said mobile station register, configured to employ said hash key to determine a plurality of parameters, wherein each of said plurality of parameters comprises a single control channel that is common for all of said corresponding plurality of cellular subscriptions, and wherein said single control channel is employed for concurrent communications with the base station for said all of said corresponding plurality of cellular subscriptions.

5. The base station as recited in claim 4, wherein said single hash key comprises an electronic serial number corresponding to the mobile station.

6. A method comprising:
   employing a plurality of removable user identification modules within a mobile station to store information associated with a corresponding plurality of user identifications for a corresponding plurality of cellular subscriptions;
   generating a single hash key common to the corresponding plurality of cellular subscriptions based on the information stored in the plurality of removable user identification modules; and
   using the hash key to determine a plurality of parameters, wherein each of the plurality of parameters comprises a single control channel that is common for all of the corresponding plurality of cellular subscriptions, and wherein the single control channel is employed for concurrent communications with a base station for the all of the corresponding plurality of cellular subscriptions.

7. The method as recited in claim 6, wherein the single hash key comprises an electronic serial number.

8. The method recited in claim 7, further comprising:
   transmitting the single hash key to a cellular network by a registration message of the mobile station over the cellular network; and
   receiving a registration acknowledgement message which indicates hash key adoption status by the cellular network.

9. The method recited in claim 6, wherein said using determines a single paging channel that is common for the all of the corresponding plurality of cellular subscriptions.

10. A method comprising:
    extracting a single hash key from a registration message, wherein the single hash key is common to a plurality of user identifications for a corresponding plurality of cellular subscriptions associated with a mobile station;
    sending a registration acknowledgement message to the mobile station, wherein the registration acknowledgement message indicates hash key adoption status by a base station; and
    employing the hash key to determine a plurality of parameters, wherein each of the parameters comprises a single control channel that is common for all of the corresponding plurality of cellular subscriptions, and wherein the single control channel is employed for concurrent communications with the mobile station for the all of the corresponding plurality of cellular subscriptions.

11. The method as recited in claim 10, wherein the single hash key comprises an electronic serial number corresponding to the mobile station.

12. A wireless system comprising:
    a mobile station comprising:
       a plurality of removable user identification modules, each configured to store information associated with a corresponding plurality of user identifications for a corresponding plurality of cellular subscriptions;
       key generation logic, configured to generate a single hash key common to said plurality of user identifications based on said information stored in the plurality of removable user identification modules; and first hash logic, coupled to said key generation logic, configured to employ said single hash key to determine a plurality of parameters; and a base station comprising:

a mobile station register, configured to extract said single hash key from a registration message and send a registration acknowledgement message corresponding to said mobile station, wherein the registration acknowledgement message indicates hash key adoption status by said base station, and said mobile station employs said plurality of parameters to perfect communications with said base station; and second hash logic, coupled to said mobile station register, configured to employ said single hash key to determine said plurality of parameters, wherein said each of said parameters comprises a single control channel that is common for all of said corresponding plurality of cellular subscriptions, and wherein said single control channel is employed for concurrent communications with said base station for said all of said corresponding plurality of cellular subscriptions.

13. A mobile station comprising:

a plurality of removable user identification modules, each configured to store information associated with a corresponding plurality of user identifications for a corresponding plurality of cellular subscriptions;

key generation logic, configured to generate a single hash key common to said corresponding plurality of user identifications based on said information stored in said plurality of removable user identification modules;

hash logic, coupled to said key generation logic, configured to employ said single hash key to determine a plurality of parameters, and wherein each of said plurality of parameters comprises a single control channel that is common for all of said corresponding plurality of cellular subscriptions, and wherein said single control channel is employed for concurrent communications with a base station for said all of said corresponding plurality of cellular subscriptions; and registration logic, coupled to said plurality of removable user identification modules and said key generation logic, configured to receive said single hash key and to send a registration message to said base station in a cellular network.

14. A mobile station comprising:

a plurality of removable user identification modules, each configured to store information associated with a corresponding plurality of user identifications for a corresponding plurality of cellular subscriptions;

key generation logic, configured to generate a single hash key common to said corresponding plurality of user identifications based on said information stored in the plurality of removable user identification modules; and hash logic, coupled to said key generation logic, configured to employ said hash key to determine a plurality of parameters, and wherein each of said parameters comprises a single control channel that is common for all of said corresponding plurality of cellular subscriptions, and wherein said single control channel is employed for concurrent communications with a base station for said all of said corresponding plurality of cellular subscriptions, wherein said key generation logic performs a contractive mapping of input data to said single hash key having a fixed length.

* * * * *